(12) United States Patent
Brown et al.

(10) Patent No.: US 10,740,211 B2
(45) Date of Patent: Aug. 11, 2020

(54) METHODS AND SYSTEMS TO TAG TOKENS IN LOG MESSAGES

(71) Applicant: VMware, Inc., Palo Alto, CA (US)

(72) Inventors: Darren Brown, Seattle, WA (US); Nicholas Kushmerick, Seattle, WA (US); Junyuan Lin, Seattle, WA (US)

(73) Assignee: VMware, Inc., Palo Alto, CA (US)

( * ) Notice: Subject to any disclaimer, the term of this patent is extended or adjusted under 35 U.S.C. 154(b) by 274 days.

(21) Appl. No.: 15/824,781

(22) Filed: Nov. 28, 2017

(65) Prior Publication Data

US 2019/0163603 A1    May 30, 2019

(51) Int. Cl.
*G06F 11/34* (2006.01)
*G06F 11/30* (2006.01)
*G06F 11/07* (2006.01)

(52) U.S. Cl.
CPC ...... *G06F 11/3476* (2013.01); *G06F 11/0787* (2013.01); *G06F 11/3072* (2013.01); *G06F 11/3075* (2013.01); *G06F 11/3082* (2013.01)

(58) Field of Classification Search
CPC ............. G06F 11/3476; G06F 11/3072; G06F 11/3075; G06F 11/3082; G06F 11/0787
See application file for complete search history.

(56) References Cited

U.S. PATENT DOCUMENTS

| | | | |
|---|---|---|---|
| 10,127,301 B2 * | 11/2018 | Morfonios | G06F 16/355 |
| 10,572,329 B2 * | 2/2020 | Harutyunyan | G06F 11/0751 |
| 10,594,546 B1 * | 3/2020 | Davis | G06F 11/3476 |
| 2002/0124074 A1 * | 9/2002 | Levy | G06F 11/3495 709/224 |
| 2005/0138111 A1 * | 6/2005 | Aton | G06F 11/3476 709/201 |
| 2006/0230071 A1 * | 10/2006 | Kass | G06Q 10/00 |
| 2007/0038889 A1 * | 2/2007 | Wiggins | G05B 23/0264 714/20 |
| 2007/0060367 A1 * | 3/2007 | Heler | G06Q 10/06 463/42 |
| 2008/0086363 A1 * | 4/2008 | Kass | G06Q 10/04 705/7.29 |
| 2009/0241174 A1 * | 9/2009 | Rajan | G06F 21/31 726/5 |

(Continued)

FOREIGN PATENT DOCUMENTS

| | | | | |
|---|---|---|---|---|
| EP | 2282449 A2 * | 2/2011 | | H04L 63/1425 |
| KR | 20130131682 A * | 12/2013 | | G06F 21/33 |
| WO | WO-2016093839 A1 * | 6/2016 | | |

*Primary Examiner* — Kostas J Katsikis

(57) ABSTRACT

This disclosure is directed to tagging tokens or sequences of tokens in log messages generated by a logging source. Event types of log messages in a block of log messages are collected. A series of tagging operations are applied to each log message in the block. For each tagging operation, event types that are qualified to receive the corresponding tag are identified. When a log message is received, the event type is determined and compared with the event types of the block in order to identify a matching event type. The series of tagging operations are applied to the log message to generate a tagged log message with the restriction that each tagging operation only applies a tag to token or sequences of tokens when the event type is qualified to receive the tag. The tagged log message is stored in a data-storage device.

12 Claims, 18 Drawing Sheets

(56) References Cited

U.S. PATENT DOCUMENTS

| | | | |
|---|---|---|---|
| 2010/0169118 A1* | 7/2010 | Rottsolk | G06Q 10/06 |
| | | | 705/3 |
| 2014/0282031 A1* | 9/2014 | Hinterbichler | G06F 11/3656 |
| | | | 715/738 |
| 2016/0092295 A1* | 3/2016 | Rajkovic | G06F 11/3476 |
| | | | 714/49 |
| 2016/0092552 A1* | 3/2016 | Morfonios | G06F 16/355 |
| | | | 707/737 |
| 2016/0170814 A1* | 6/2016 | Li | G06F 9/542 |
| | | | 719/318 |
| 2017/0178025 A1* | 6/2017 | Thomas | G06N 5/025 |
| 2017/0178026 A1* | 6/2017 | Thomas | G06F 21/552 |
| 2017/0180403 A1* | 6/2017 | Mehta | H04L 63/1416 |
| 2018/0102938 A1* | 4/2018 | Yoon | G06F 11/30 |
| 2018/0165142 A1* | 6/2018 | Harutyunyan | G06F 11/3476 |
| 2018/0165173 A1* | 6/2018 | Lin | G06F 11/3476 |
| 2019/0079993 A1* | 3/2019 | Morfonios | G06F 16/23 |
| 2019/0095417 A1* | 3/2019 | Xu | G06F 40/284 |
| 2019/0163603 A1* | 5/2019 | Brown | G06F 11/3476 |

* cited by examiner

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
```

404 — $Time_date
405 — Thread-$X/$IP
406 — INFO
402 (figure label)
408, 410 (labels)

FIG. 4

```
[2017-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
```

504, 505, 506, 502 (labels)

FIG. 5

METHODS AND SYSTEMS TO TAG TOKENS IN LOG MESSAGES

TECHNICAL FIELD

This disclosure is directed to automated methods and systems to tag tokens in log messages.

BACKGROUND

Electronic computing has evolved from primitive, vacuum-tube-based computer systems, initially developed during the 1940s, to modern electronic computing systems in which large numbers of multi-processor computer systems, such as server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies.

In modern computing systems, individual computers, subsystems, applications, operating systems, and components generally output large volumes of status, informational, and error messages that are collectively referred to as "log messages." In large, distributed computing systems, terabytes of log messages may be generated each day. The log messages are typically sent to a log management server that records the log messages in event logs stored in data-storage appliances. Log management tools also apply a series of tagging operations to tokens in each log message, which is an extremely computationally intensive and time-consuming process. Because the volume and rate at which log messages are received at a log management server are so high, the log messages are typically buffered so that the series of tagging operations can be applied to each log message. Subjecting each log message to the full series of tagging operations increases cost of storage and creates a significant delay in the amount it takes for real-time analysis of log messages for potential problems. System administrators seek methods and systems that reduce the amount of temporary data storage for ingesting log messages and reduces the amount of time between ingesting log messages and recording the log messages in an event log.

SUMMARY

Automated computational methods and systems that tag tokens of log messages of an event source are described. A block of log messages generated by the event source are collected over a period of time. Event type analysis is used to determine the event type of each log message in the block of log messages. A series of tagging operations are applied to tokens or sequences of tokens in each log message of the block of log messages. For each tagging operation, event types that are qualified to receive the corresponding tag are identified. When a new log message is received, event-type analysis is applied to the log message to identify an event type of the log message. The event type of the new log message is compared with the event types of the block of tagged log messages. The series of tagging operations are applied to tokens or sequences of tokens in the new log message to generate a tagged log message with the restriction that each tagging operation only applies when the log message matches an event type that is qualified to receive a tag from the tagging operation. Methods and systems reduce the amount of heavy computation and computational time to recording tagged log message in a data-storage device.

DESCRIPTION OF THE DRAWINGS

FIG. 4 shows an example of a log write instruction.

FIG. 5 shows an example of a log message generated by a log write instruction.

DETAILED DESCRIPTION

Figure 1:
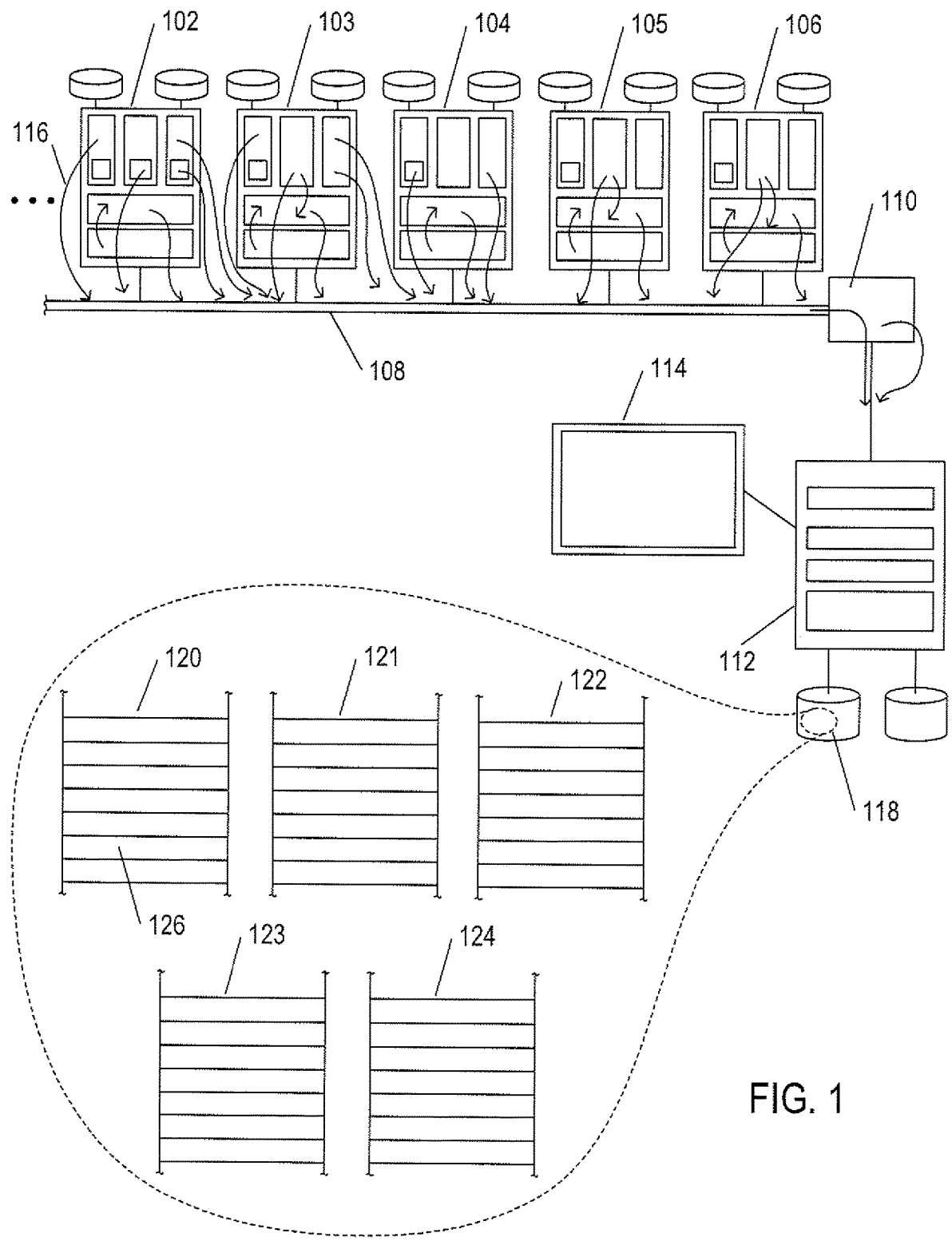
FIG. 1 shows an example of logging log messages in event logs.

FIG. 1 shows an example of logging log messages in event logs. In FIG. 1, a number of computer systems 102-106 within a distributed computing system are linked together by an electronic communications medium 108 and additionally linked through a communications bridge/router 110 to an administration computer system 112 that includes an administrative console 114. One or more of the computer systems 102-106 may run a log monitoring agent that collects and forwards log messages to a log management server that runs on the administration console 114. As indicated by curved arrows, such as curved arrow 116, multiple components within each of the discrete computer systems 102-106 as well as the communications bridge/router 110 generate log messages that are forwarded to the log management server. Log messages may be generated by any event source. Event sources may be, but are not limited to, application programs, operating systems, VMs, guest operating systems, containers, network devices, machine codes, event channels, and other computer programs or processes running on the computer systems 102-106, the bridge/router 110 and any other components of the distributed computing system. Log messages may be collected at various hierarchical levels within a discrete computer system and then forwarded to the log management server in the administration computer 112. For example, a log monitoring agent running on one or more of the computer systems 102-106 collects and forwards the log messages at various hierarchical levels. The log management server in the administration computer 112 collects and stores the received log messages in a data-storage device or appliance 118 as event logs 120-124. Rectangles, such as rectangle 126, represent individual log messages. For example, event log 120 may comprise a list of log messages generated within the computer system 102. Each log monitoring agent has an agent monitoring configuration that includes a log path and a log parser. The log path specifies a unique file system path in terms of a directory tree hierarchy that identifies the storage location of an event log associated with the event source on the administrative console 114 or the data-storage device or appliance 118. The log monitoring agent receives specific file and event channel log paths to monitor event logs and the log parser includes log parsing rules to extract and format lines of log message into log message fields. The log monitoring agent then sends the constructed structured log messages to the log management server. The administrative console 114 and computer systems 102-106 can function without log management agents and a log management server, but with less precision and certainty.

Figure 2:
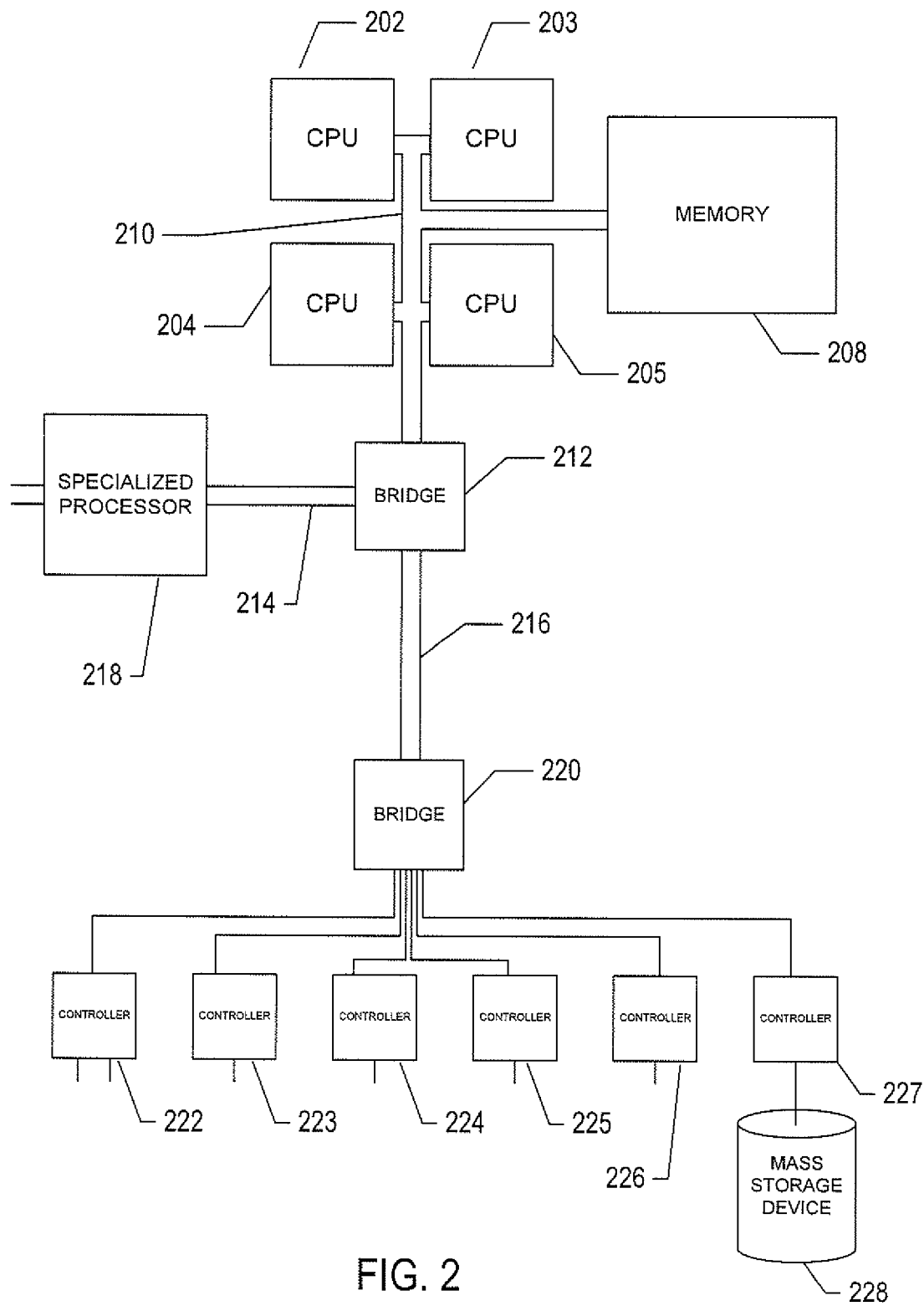
FIG. 2 shows an example of a source code with log write instructions.

There are many different types of architectures of the computer systems 102-106 and 112 that differ from one another in the number of different memories, including different types of hierarchical cache memories, the number of processors and the connectivity of the processors with other system components, the number of internal communications busses and serial links, and in many other ways. FIG. 2 shows a general architectural diagram for various types of computer systems. The computer system contains one or multiple central processing units ("CPUs") 202-205, one or more electronic memories 208 interconnected with the CPUs by a CPU/memory-subsystem bus 210 or multiple busses, a first bridge 212 that interconnects the CPU/memory-subsystem bus 210 with additional busses 214 and 216, or other types of high-speed interconnection media, including multiple, high-speed serial interconnects. These busses or serial interconnections, in turn, connect the CPUs and memory with specialized processors, such as a graphics processor 218, and with one or more additional bridges 220, which are interconnected with high-speed serial links or with multiple controllers 222-227, such as controller 227, that provide access to various different types of mass-storage devices 228, electronic displays, input devices, and other such components, subcomponents, and computational devices. It should be noted that computer-readable data-storage devices include optical and electromagnetic disks, electronic memories, and other physical data-storage devices.

Figure 3:
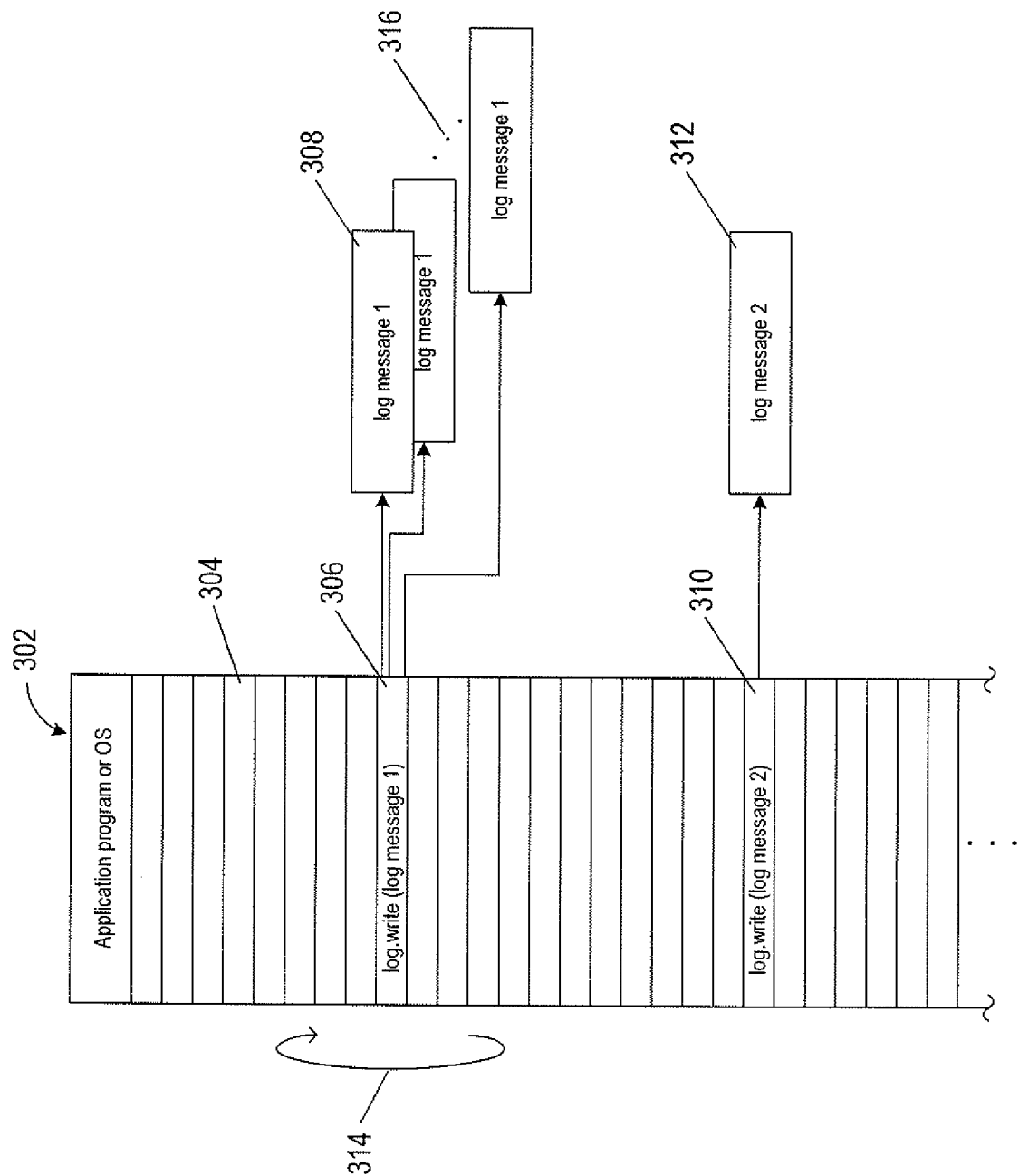
FIG. 3 shows an example of a source code and log messages generated from log write instructions.

FIG. 3 shows an example of a source code 302 of an application program, an operating system, a virtual machine, a container, a guest operating system, or any other computer program or machine code. The source code 302 is just one example of an event source that generates log messages. Rectangles, such as rectangle 304, represent a definition, a comment, a statement, or a computer instruction that expresses some action to be executed by a computer. The source code 302 includes log write instructions that generate log messages when certain events predetermined by the developer occur during execution of the source code 302. For example, source code 302 includes an example log write instruction 306 that when executed generates an "log message 1" represented by rectangle 308, and a second example log write instruction 310 that when executed generates "log message 2" represented by rectangle 312. In the example of FIG. 3, the log write instruction 308 is embedded within a set of computer instructions that are repeatedly executed in a loop 314. As shown in FIG. 3, the same log message 1 is repeatedly generated 316. The same type of log write instructions may also be located in different places throughout the source code, which in turns creates repeats of essentially the same type of log message in the event log.

In FIG. 3, the notation "log.write( )" is a general representation of a log write instruction. In practice, the form of the log write instruction varies for different programming languages. In general, log messages are relatively cryptic, including generally only one or two natural-language words and/or phrases as well as various types of text strings that represent file names, path names, and, perhaps various alphanumeric parameters. In practice, a log write instruction may also include the name of the source of the log message (e.g., name of the application program or operating system and version) and the name of the event log to which the log message is to be written. Log write instructions may be written in a source code by the developer of an application program or operating system in order to record events that occur while an operating system or application program is running. For example, a developer may include log write instructions that are executed when certain events occur, such as failures, logins, or errors.

FIG. 4 shows an example of a log write instruction 402. In the example of FIG. 4, the log write instruction 402 includes arguments identified with "S." For example, the log write instruction 402 includes a time-stamp argument 404, a thread number argument 405, and an internet protocol ("IP") address argument 406. The example log write instruction 402 also includes text strings and natural-language words and phrases that identify the type of event that triggered the log write instruction, such as the word "repair" 408. The text strings between brackets "[ ]" represent file-system paths, such as path 410. When the log write instruction 402 is executed, parameters are assigned to the arguments and the text strings and natural-language words and phrases are stored as a log message in an event log.

FIG. 5 shows an example of a log message 502 generated by the log write instruction 402. The arguments of the log write instruction 402 may be assigned numerical parameters that are recorded in the log message 502 at the time the log message is generated or written to the event log. For example, the time stamp 404, thread 405, and IP address 406 of the log write instruction 402 are assigned corresponding numerical parameters 504-506 in the log message 502. The time stamp 504, in particular, represents the date and time the log message is generated. The text strings and natural-language words and phrases of the log write instruction 402 also appear unchanged in the log message 502 and may be used to identify the type of event that occurred during execution of the application program or operating system.

As log messages are received by the log management tool from various event sources, tagging operations are executed for each token or sequence of tokens in each log message.

Figure 6:
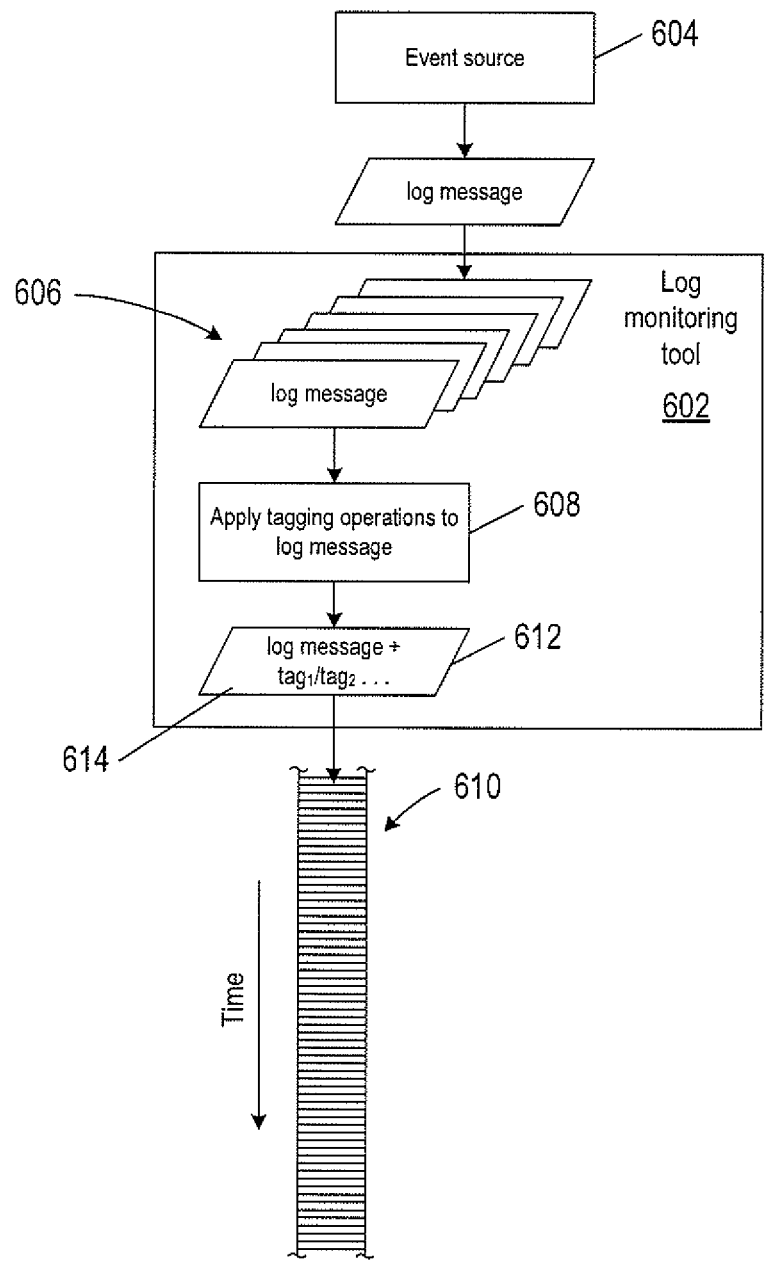
FIG. 6 shows an example of a log management tool 602 that receives log messages from an event source.

The log messages are then stored in the order in which the log messages are received. FIG. 6 shows an example of a log management tool 602 that receives log messages from an event source 604. In this example, log messages 606 are buffered so that a series of tagging operations 608 are be applied separately to each token or sequence of tokens in each log message before each log message is recorded in an event log 610. For example, tokens of log message 612 are tagged with a series of tags 614 added by the tagging operation 608 before being recorded in the even log 610.

Figure 7:
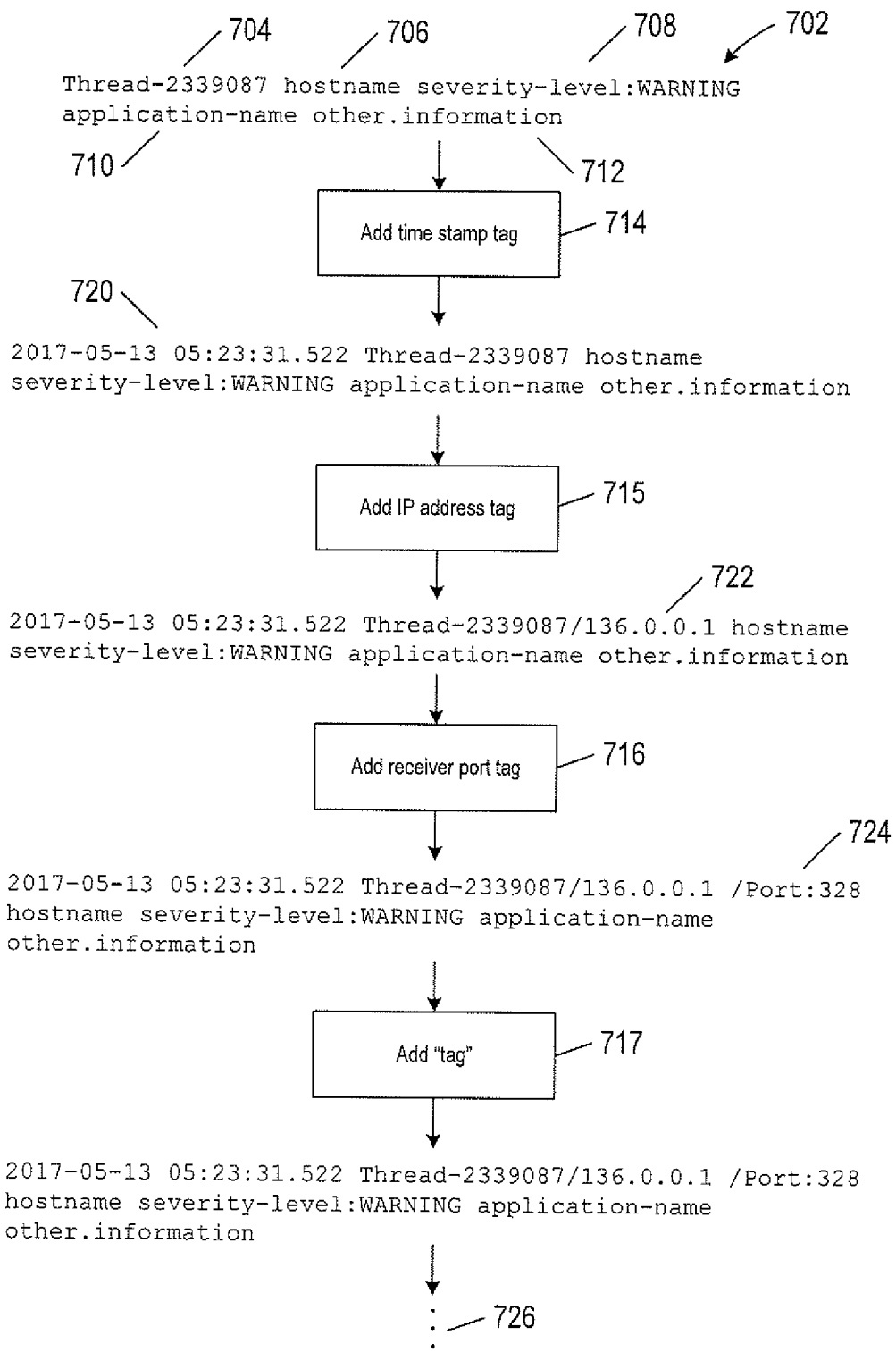
FIG. 7 shows an example series of tagging operations applied to a log message received by a log monitoring tool.

FIG. 7 shows an example series of tagging operations applied to a log message 702 received by a log monitoring tool. The log message 702 comprises a number of tokens, such as a thread identifier 704, hostname 706 of the server computer that runs the event source, priority or severity level 708, name of the event source 710, and tokens that record other information 712. When the log message 702 is received by the log management tool, a series of tagging operations 714-717 are executed for each token or sequence of tokens of the log message 702. Each tagging operation is typically executed on a log message when a certain token or sequence of tokens is present. Each token in the log message is examined by each tagging operation to determine if the tagging operation should be executed. For example, each of the five tokens in log message 702 is separately examined during tagging operations 714-717 before the corresponding tag is added to the token. Tagging operation 714 examines each of the five tokens, identifies the tread identifier token 704 and adds a time stamp tag 720 before the thread 704. Tagging operation 715 examines each of the five tokens, identifies the application name token 710, and adds an internet protocol ("IP") address tag 722 of the server computer that hosts the application program. Tagging operation 716 examines each of the five tokens, identifies the hostname token 706, and adds a receiver port identifier tag 724 that identifies the port of the administrative computer system at which the log message 702 was received. By contrast, tagging operation 717 examines each of the five tokens and does not find a token or sequence of tokens that triggers adding a "tag" to a token of the log message 702. In other words, even though the tagging operation 717 does not result in adding a tag to the log message 702, the tagging operation 717 is still executed for each token or sequence of tokens in the log message 702. Ellipsis 726 represents additional tagging operations, each of which examines each token or sequence of tokens in the log message 702 and may or may not add tags to certain tokens in the log message 702.

Figure 8:
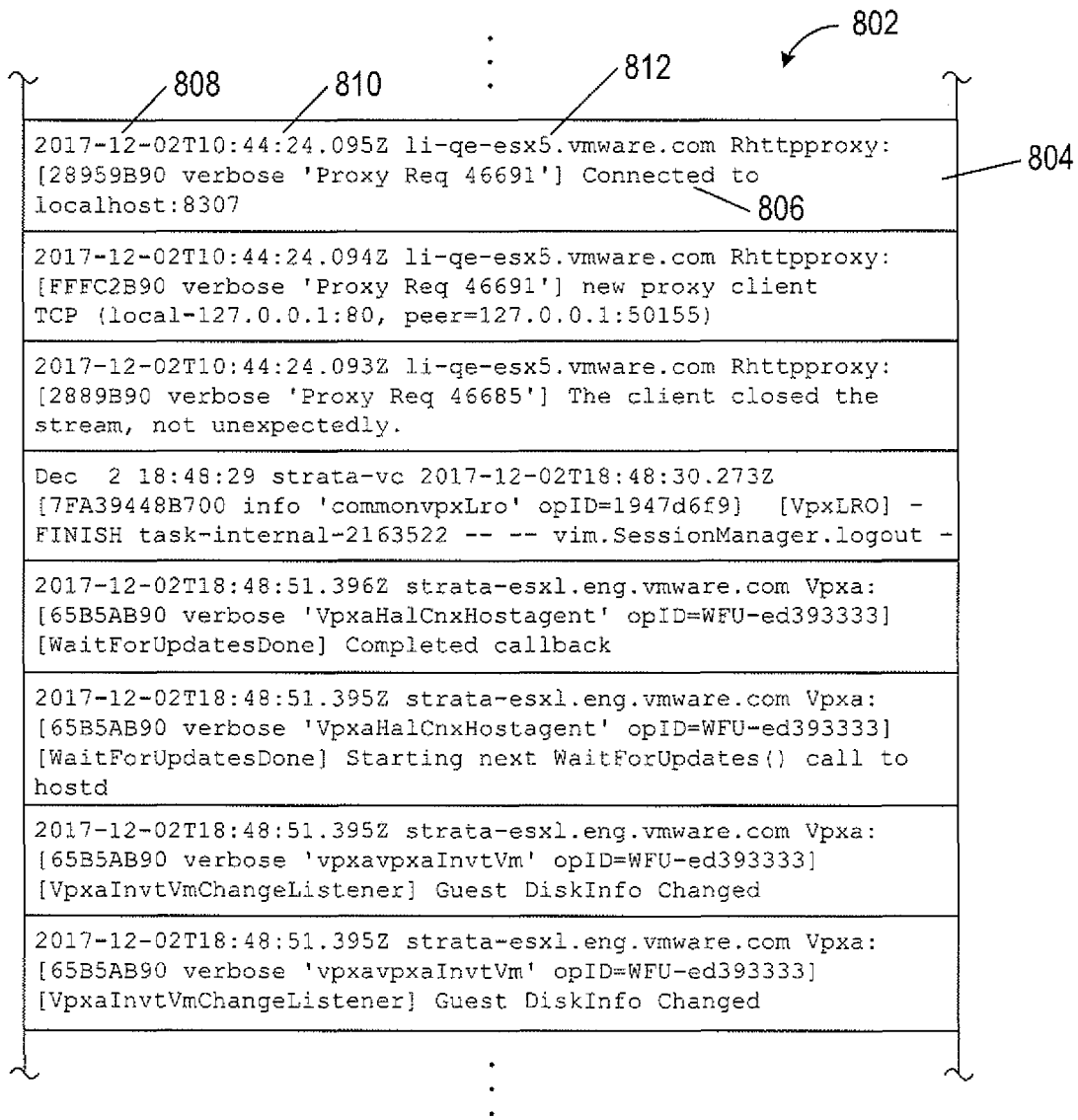
FIG. 8 shows a small, eight-entry portion of an event log.

When the tagging operations have been completed, the tagged log messages are recorded in an event log. FIG. 8 shows a small, eight-entry portion of an event log 802. In FIG. 8, each rectangular cell, such as rectangular cell 804, of the portion of the event log 802 represents a single stored log message. For example, log message 802 includes a short natural-language phrase 806, date 808 and time 810 numerical parameters, as well as, an alphanumeric parameter 812 that appears to identify a particular host computer.

Executing the series of tagging operations for each token or particular combinations of tokens in each log message, whether the tags are added or not, is a heavy computational burden and a time-consuming process. Received log messages are buffered so that a series of tagging operations can be executed for each token or particular combination or tokens of each log message before the log message is recorded in a corresponding event log. As a result, additional storage is made available to store the backlog of log messages received by the log management tool and a sizable portion of the computational resources of an administrative computer system are dedicated to processing each tagging operation, which increases costs and waste time attempting to apply each tag to each token of each log message even when the tag does not apply.

In order to speed up logging by the log management tool, methods use event types of the log messages to determine if a tagging operation should be executed on the log messages with a particular event type. A block of untagged log messages sent to the log management tool are copied and stored over a period of time. The period of time may be a day, two days, three days, or a week. The number of untagged log messages collected in the period of time may be on the order of thousands, tens of thousands, hundreds of thousands, or millions of log messages. Each of the log messages has a unique event type, but many log messages have the same event type. Event-type analysis is applied to each of the untagged log messages in order to determine the event type of each log message in the block of untagged log messages.

Figure 9:
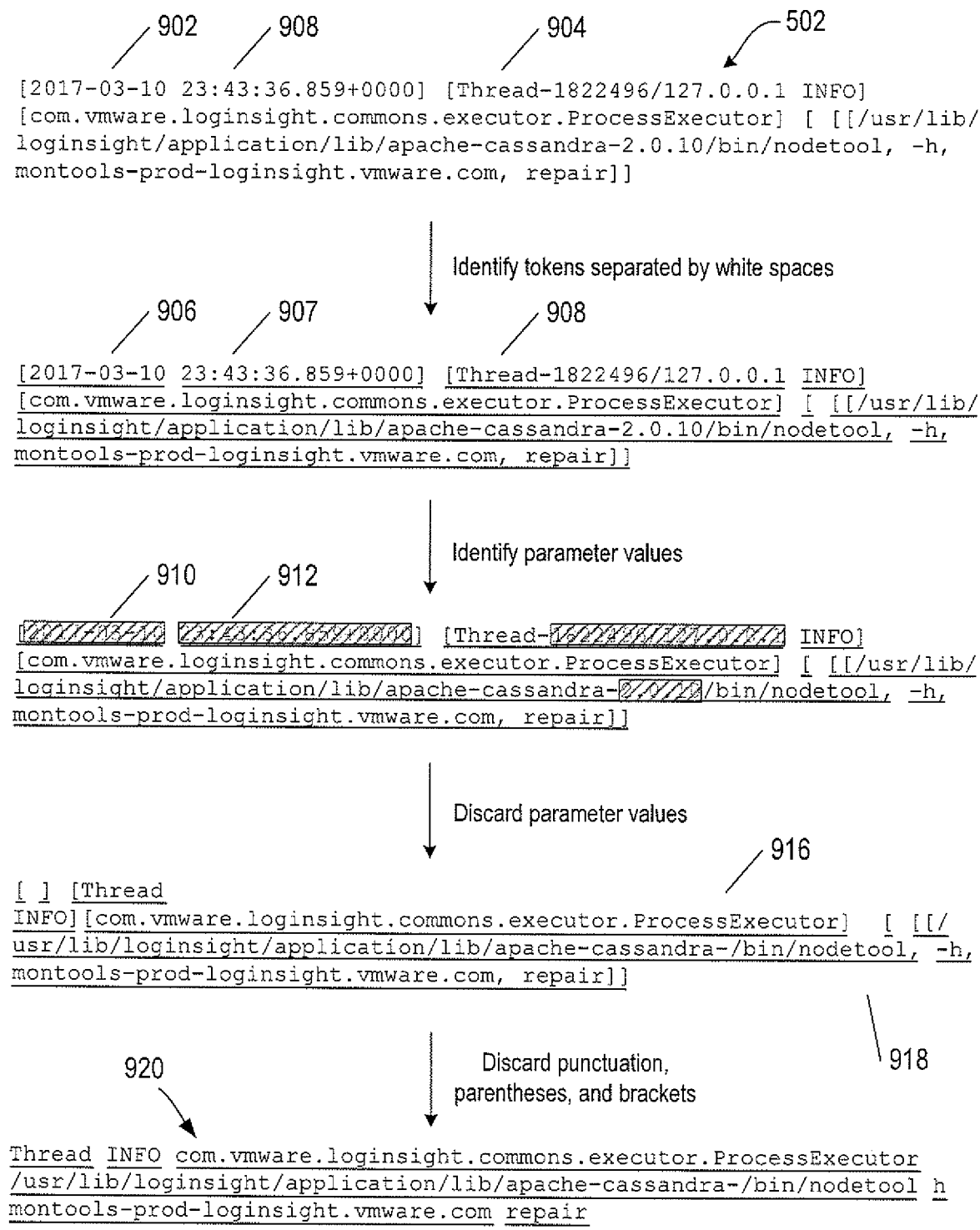
FIG. 9 shows an example of event-type analysis performed on the log message shown in FIG. 5.

FIG. 9 shows an example of event-type analysis performed on the log message 502 shown in FIG. 5. The log message 502 is first tokenized by considering the log message as comprising tokens separated by non-printed characters, referred to as "white space." In FIG. 9, this initial tokenization of the log message 502 is illustrated by underlining of the printed or visible characters. For example, the date 902, time 903, and thread 1804 at the beginning of the text contents of the log message 902, following initial tokenization, become a first token 906, a second token 907, and a third token 908, as indicated by underlining. Next, a token-recognition pass is made to recognize any of the initial tokens as various types of parameters. Parameters are tokens or message fields that are likely to be highly variable over a set of messages of a particular type. Date/time stamps, for example, are nearly unique for each log message, with two log messages having an identical date/time stamp only in the case that the two log messages are generated within less than a second of one another. Additional examples of parameters include global unique identifiers ("GUIDs"), hypertext transfer protocol status values ("HTTP statuses"), universal resource locators ("URLs"), network addresses, and other types of common information entities that identify variable aspects of an event type. By contrast, the word "repair" in log message 502 likely occurs within each of many repair session log messages. In FIG. 9, the parametric-valued tokens in the log message following initial token recognition are indicated by shading. For example, initial token recognition determines that the first token 906 is a date and the second token 907 is a time. The tokens identified as parameters are identified by shaded rectangles, such as shaded rectangle 910 of the date 906 and shaded rectangle of 912 of the time 907. The parametric-valued tokens are discarded leaving the non-parametric tokens, which are text strings, natural language words and phrases, punctuation, parentheses, and brackets. Various types of symbolically encoded values, including dates, times, machine addresses, network addresses, and other such parameters can be recognized using regular expressions or programmatically. For example, there are numerous ways to represent dates. A program or a set of regular expressions can be used to recognize symbolically encoded dates in any of the common formats. It is possible that the token-recognition process may incorrectly determine that an arbitrary alphanumeric string represents some type of symbolically encoded parameter when, in fact, the alphanumeric string only coincidentally has a form that can be interpreted to be a parameter. The currently described methods and systems do not depend on absolute precision and reliability of the event-message-preparation process. Occasional misinterpretations generally do not result in mistyping of log messages and, in the rare circumstances in which log messages may be mistyped, the mistyping is most often discovered during subsequent processing. In the implementation shown in FIG. 9, the log message 502 is subject to textualization in which an additional token-recognition step of the non-parametric portions of the log message is performed in order to remove punctuation and separation symbols, such as parentheses and brackets, commas, and dashes that occur as separate tokens or that occur at the leading and trailing extremities of previously recognized non-parametric tokens, as shown by underlining in the retokenized log message 914 in FIG. 9. For example, brackets and a coma 918 are underlined. The punctuation, parentheses, and brackets are discarded leaving a textualized log message of interest 920 that comprises only the non-parametric tokens, including text strings and natural language words and phrases of the original log message 502. The textualized log message 920 represents an event type. Other textualized log messages with the same non-parametric text strings and natural language words and phrase as the textualized log messages 920 are the same event type. Another textualized log message with one or more different non-parametric text strings or natural language words and phrase from those of the textualized log messages 920 is of a different event type.

Figure 10:
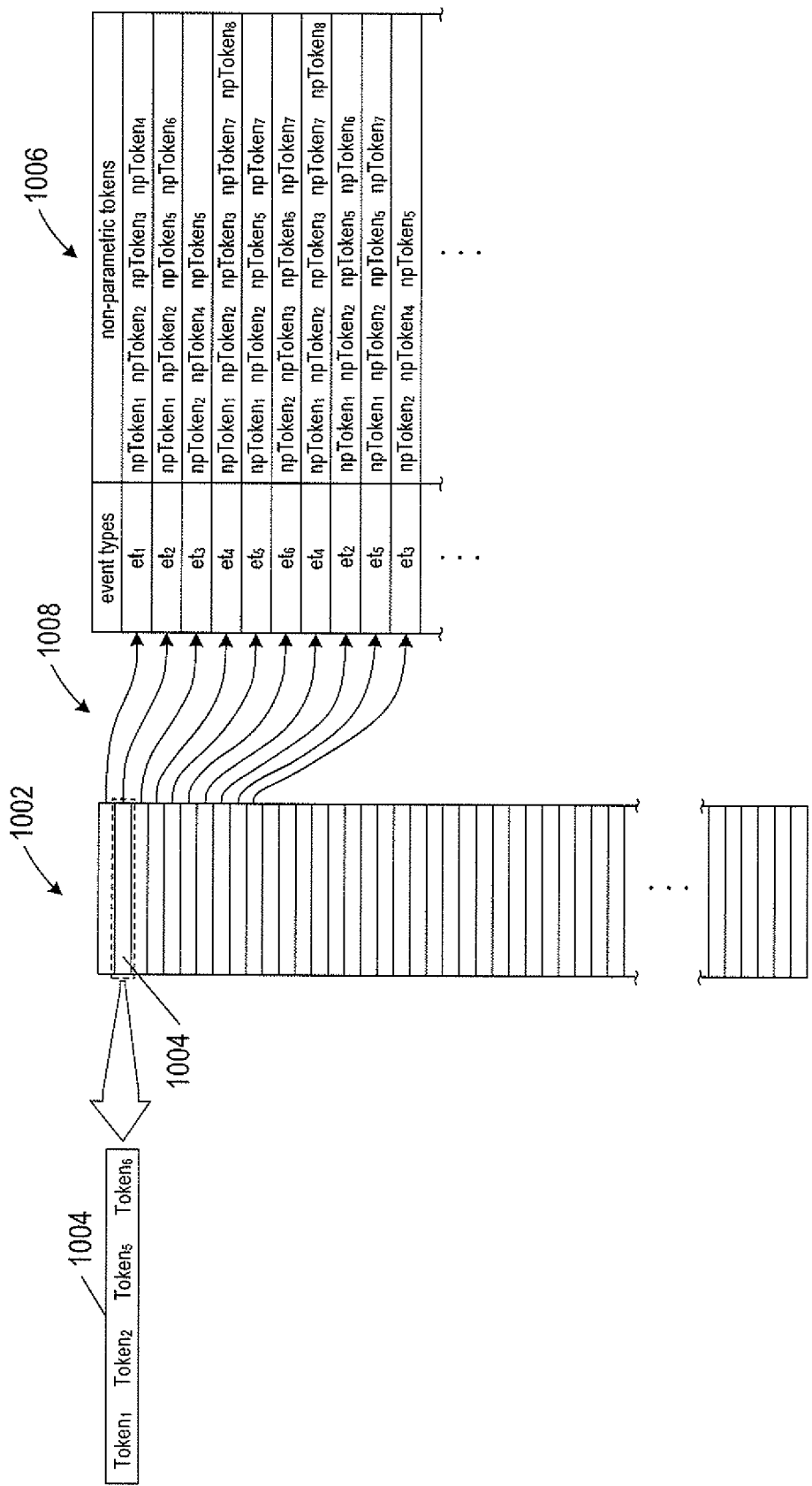
FIG. 10 shows event-type analysis applied to each log message in a block of untagged log messages.

FIG. 10 shows event-type analysis applied to each log message in a block of untagged log messages 1002. Each log messages comprises a number of tokens denoted by $Token_k$, where subscript k is a token index used to distinguish different tokens. For example, log message 1004 comprises four tokens denoted by $Token_1$, $Token_2$, $Token_5$, and $Token_6$. FIG. 10 includes a table 1006 of event types denoted by $et_n$, where n is a positive integer event-type index used to identify different event types. Each event type is distinguished by a unique set of non-parametric tokens determined as described above with reference to FIG. 9. Non-parametric tokens of each event type are denoted by $npToken_k$. Directional arrows 1008 represent correspondence between log messages and event types in the table 1006. For example, table 1006 event type $et_2$ comprises non-parametric tokens denoted by $npToken_1$, $npToken_2$, $npToken_5$, and $npToken_6$ obtained from applying event-type analysis to the log message 1004. Log message 1004 is identified as event type $et_2$.

Figures 11, 12:
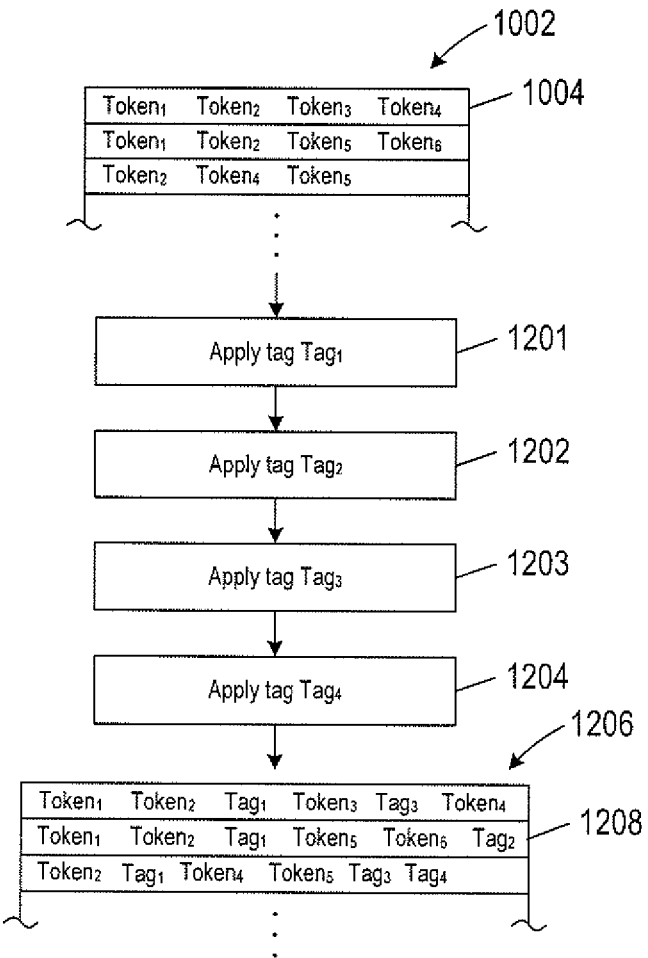
FIG. 11 shows a table of six different example event types.
FIG. 12 shows an example series of tagging operations applied to the first three log messages of a block of untagged log messages.

Log messages in the block of untagged log messages 1002 of each event type are counted. FIG. 11 shows an example of six different event types with event-type index n equal to 1, 2, 3, 4, 5, and 6 for the block of untagged log messages 1002. Column 1102 displays a parameter $C_n$ for each event type. The parameter $C_n$ denotes the number of log messages of the same event type $et_n$.

The series of tagging operations is executed for each token or particular sequence of tokens in each log message of the block of untagged log messages. FIG. 12 shows an example series of tagging operations applied to the first three log messages of the block of untagged log messages 1002 in FIG. 10. A series of tagging operations 1201-1205 are applied to each token or combination or tokens of each log message in the block of untagged log messages 1002 to obtain a block of tagged log messages 1206, as described above with reference to FIG. 7. For example, application of the series of tagging operations 1201-1205 to untagged log message 1004 results in tagged log message 1208, which added a first tag denoted by $Tag_1$ after $Token_2$ and a second tag denoted by $Tag_g$ after $Token_6$. In this example, the tagging operations 1202, 1204, and 1205 did not apply tags to the tokens in log message 1004.

Tagged log messages in the block of tagged log messages of the same event type are identified. For each tagging operation, the number of tags applied to log messages that are the same event type are counted. A fraction of tagged log messages is calculated for each tag applied to a token in log messages of the same event type $et_n$ as follows:

$$f_{k,n} = \frac{T_k}{C_n} \tag{1}$$

where $T_k$ is the total number of log messages with tokens tagged with the tag $Tag_k$.
When the fraction of tagged log messages of Equation (1) satisfies the following condition $$f_{k,n} < Th_k < 1 \tag{2}$$

where $Th_k$ is a tagging threshold associated with the tag $Tag_k$,
log messages with the event type $et_n$ are disqualified from receiving the tag $Tag_k$. On the other hand, when the following condition is satisfied $$Th_k \leq f_{k,n} \leq 1 \tag{3}$$

log messages with event type $et_n$ are qualified to receive the tag $Tag_k$. Example thresholds include 0.001, 0.0001, or even 0.00001. In other implementations, rather than having a tagging threshold for each tag, a single tagging threshold, Th, may be used for the various tags.

Figure 13:
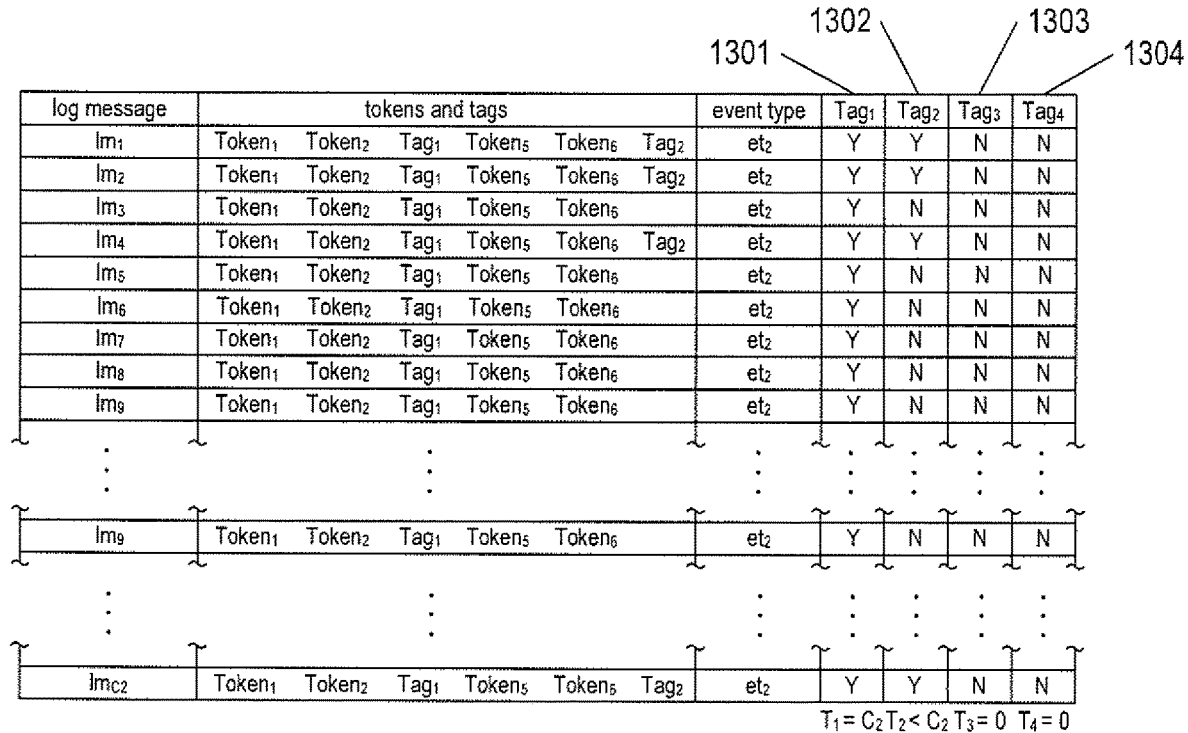
FIG. 13 shows a table of example tagged log messages with the same event type.

FIG. 13 shows a table of example tagged log messages with the event type $et_2$. Columns 1301-1304 list tags where "Y" entries indicate that a corresponding tag has been applied to tokens of a log message and "N" entries indicate that no tag has been applied to tokens of a log message. For example, tokens $Token_2$ and $Token_6$ of the second log message $lm_2$ received tags $Tag_1$ and $Tag_g$ but no tokens received tags $Tag_3$ and $Tag_4$. By contrast, the third log message $lm_3$ received tag $Tag_1$ but did not receive tags $Tag_2$, $Tag_3$ and $Tag_4$. The total number of log messages that received a tag are $T_1=C_2$, $T_2<C_2$, $T_3=0$, and $T_4=0$. Because the fractions of tagged log messages associated with the tags $Tag_3$ and $Tag_4$ are less than the tagging threshold (i.e., $f_3=f_4=0$), the event type $et_2$ is disqualified from being considered for the tags $Tag_3$ and $Tag_4$. The fraction of tagged log messages associated with the tag $Tag_1$ equals 1 (i.e., $f_1=0$), which is greater than the tagging threshold. As a result, the event type $et_2$ is qualified to receive the tag $Tag_1$. In the example of FIG. 13, the total number of log messages that received the tag $Tag_2$ is less than $C_2$ and if the $f_2<Th_2$, the event type would be disqualified from receiving the tag $Tag_2$.

Figure 14:
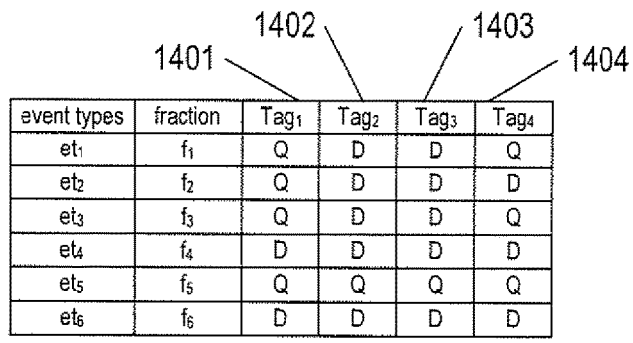
FIG. 14 shows a table of event types and an example of qualified and disqualified tagging operations.

FIG. 14 shows a table of event types and an example of qualified and disqualified tags. Columns 1401-1404 a "Q" entry indicates that an event type is qualified to receive a corresponding tag and a "D" entry indicates that that event type is not qualified to receive an event type. For example, log messages with the event type $et_2$ are only qualified to receive tag $Tag_1$. The event type of an ingested log message is determined using event-type analysis and compared with the event types in the table. The qualified and disqualified taps of an event type in the table that matches the event type of the log messages are used to determine which tags are applied to the log message. For example, suppose the event type of an ingested log message matches the event type $et_1$ in the table of FIG. 14, which is qualified to receive $Tag_1$ and $Tag_4$. As a result, the log message is subjected to the tagging operations that apply the tags $Tag_1$ and $Tag_4$. The tagging operations that apply the tags $Tag_2$ and $Tag_3$ are bypassed.

Figure 15:
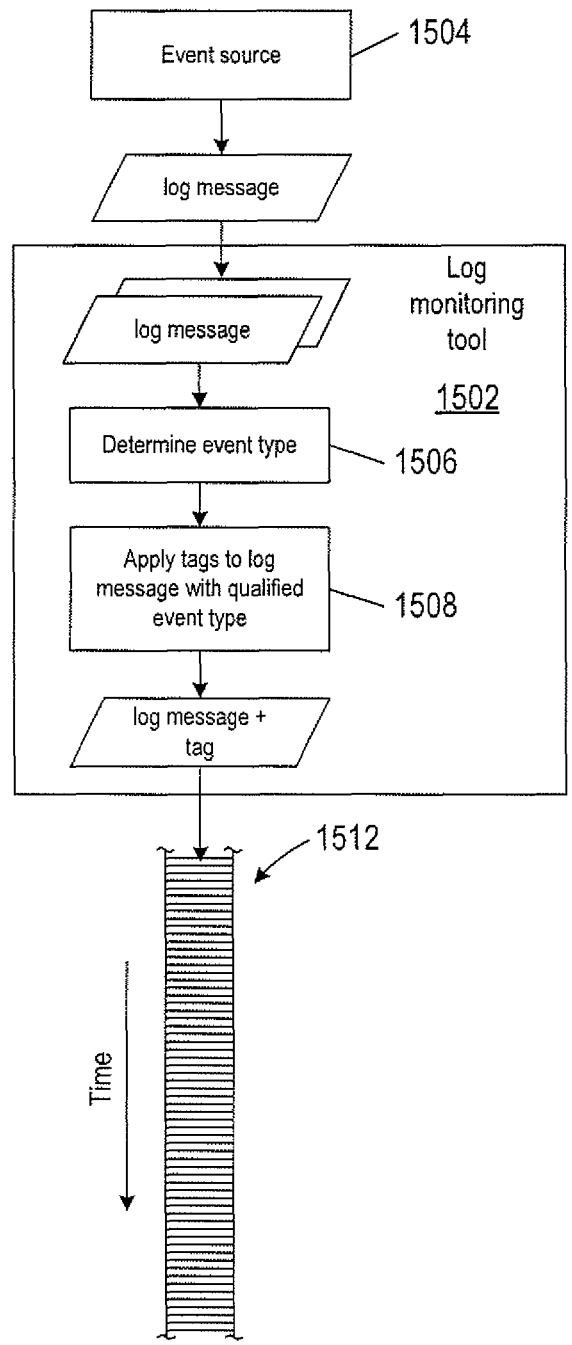
FIG. 15 shows an example of a log management tool that receives log messages from an event source.

FIG. 15 shows an example of a log management tool 1502 that receives log messages from an event source 1504. In block 1506, event-type analysis is applied to each log message received by the log management tool 1502. In block 1508, the event type is compared with the event types of the block of untagged log messages in order to determine an event type of the block that matches the event type of the log message. If the matching event type of the block is qualified to receive a tag, as describe above with reference to FIG. 14, the tag is applied to the log message. If the matching event type of the block is not qualified to receive a tag, the tag is not applied to the log message. After the log message is tagged based on the tags the matching event type of the block is qualified to receive, the tagged log message 1510 is recorded in an even log 1512. The process outlined in FIG. 15 reduces the amount of time log messages spend in an event-message buffer by not having to wait for each token or sequence of tokens of disqualified log messages from being evaluated for tagging, as described above with reference to FIGS. 6 and 7.

Figure 16A:
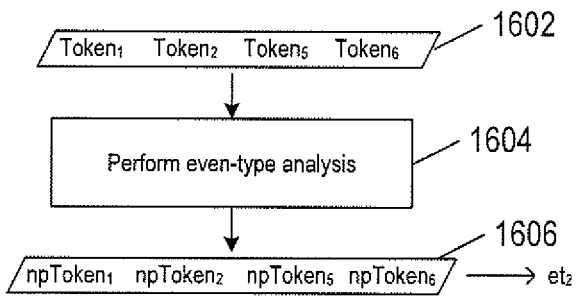
FIGS. 16A-16B shows an example of a log message handled by a log monitoring tool.
Figure 16B:
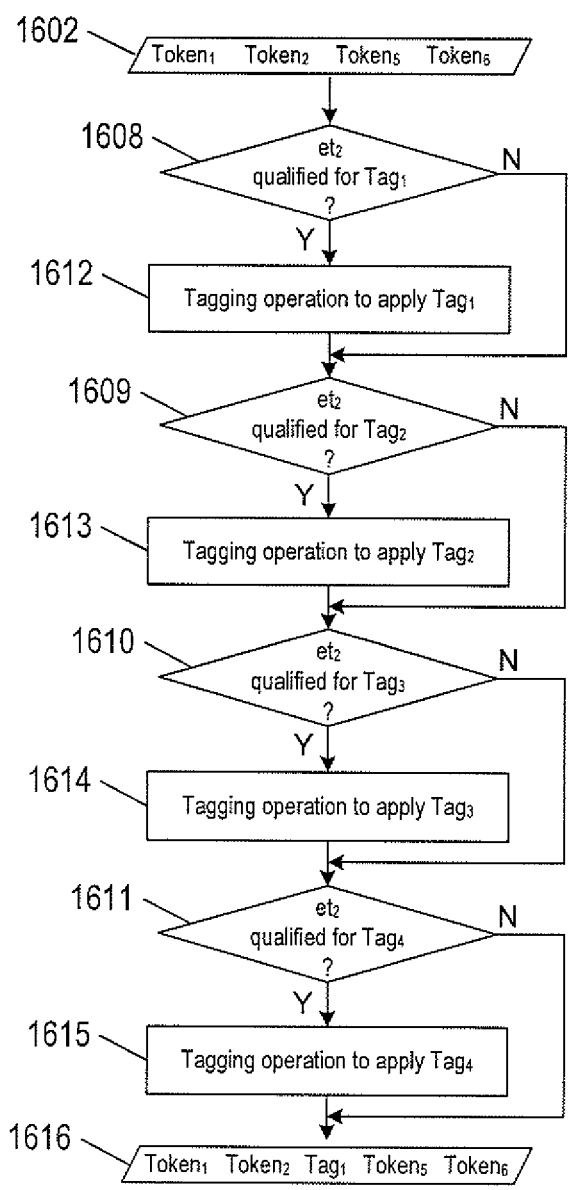

FIGS. 16A-16B shows an example of how a log message is handled by a log monitoring tool. In FIG. 16A, a log message 1602 comprising four tokens is received followed by application of event-type analysis 1604 to determine an event type 1606 of the log message, as described above with reference to FIG. 9. In this example, the event type of the log message 1602 is $et_2$. In FIG. 16B, the event type is used to qualify and disqualify the log message 1602 from tagging operations the matching event type $et_2$ is qualified and disqualified to receive according to the table in FIG. 14. In decision blocks 1608-1611, when an event type $et_2$ is qualified according to a decision block, control flows to blocks 1612-1615 in which a tagging operation is applied to the log message. For example, according to the qualified and disqualified tags in FIG. 14, event type $et_2$ is only qualified for tag $Tag_1$. As a result, only the tagging operation of block 1612 is applied to the log message 1602. Because event type $et_2$ is not qualified for tags $Tag_2$, $Tag_3$, and $Tag_4$, the tagging operations represented by blocks 1613-1615 are not applied to the log message 1602. Tagged log message 1616 is output and recorded in the corresponding event log.

The tagged log messages recorded in the event log of the event source can be used to evaluate the performance of the event source and evaluate the performance of hardware systems used to run the event source. In particular, distributions of various event types of tagged log messages may be monitored for changes that are an indication of a change in the performance of the event source or a change in performance of the hardware used to run the event source. For example, increases in the frequency of tagged log messages with severity levels that indicate warning, errors, or faults are an indication of problems with the event source. Alerts can be generated when a change occurs in the distribution of event types or when the frequency of certain event types exceed frequency thresholds.

The methods described below with reference to FIGS. 17-21 are stored in one or more data-storage devices as machine-readable instructions that when executed by one or more processors of the computer system shown in FIG. 2 to detect abnormal behavior of an event sources.

Figure 17:
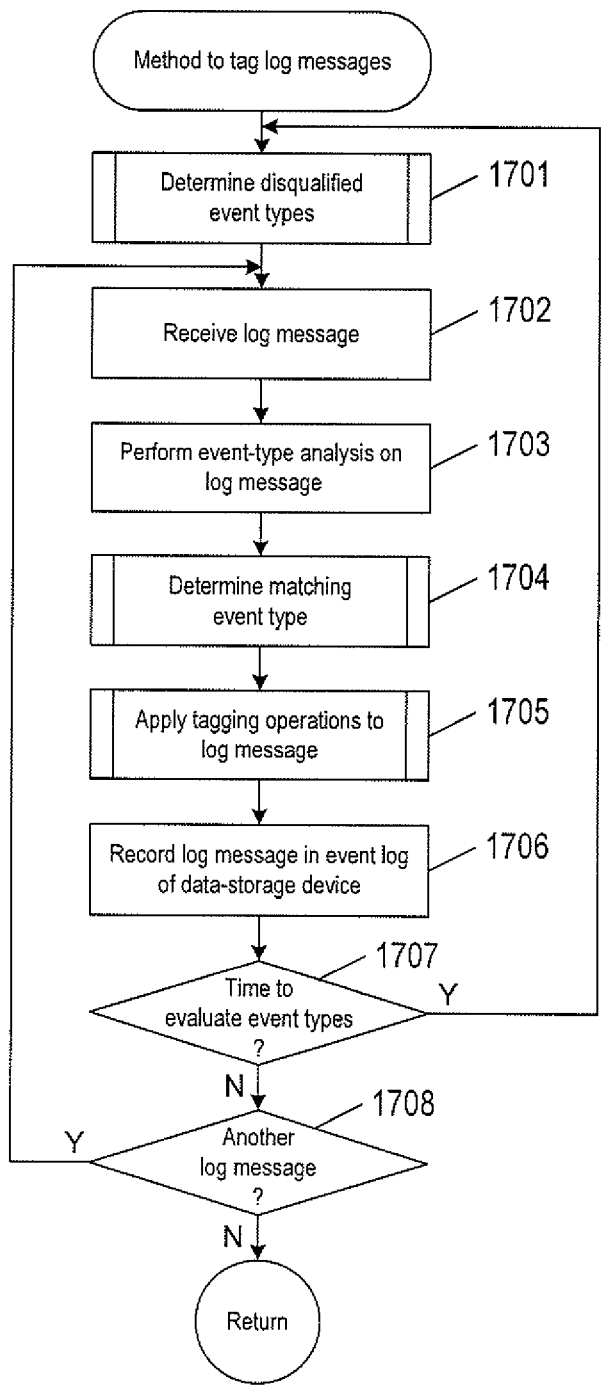
FIG. 17 shows a control flow diagram of a method to prevent superfluous tagging of log messages.

FIG. 17 shows a control flow diagram of a method to prevent superfluous tagging of log messages. In block 1701, a routine "determine disqualified event types" is called to determine event types that are disqualified from tagging operations. In block 1702, a log message is received from an event source running in a distributed computing system. In block 1703, event-type analysis is applied to the log message as described above with reference to FIG. 9. In block 1704, a routine "determine matching event type" is called. In block 1705, a routine "apply tagging operation to log message" is called. In decision block 1707, when a period of time has passed update qualified and disqualified event types, control flows block 1701. For example, updating qualified and disqualified event types may be performed every month, two months, or annually. In decision block 1708, when a log message is received control flow to block 1702.

Figure 18:
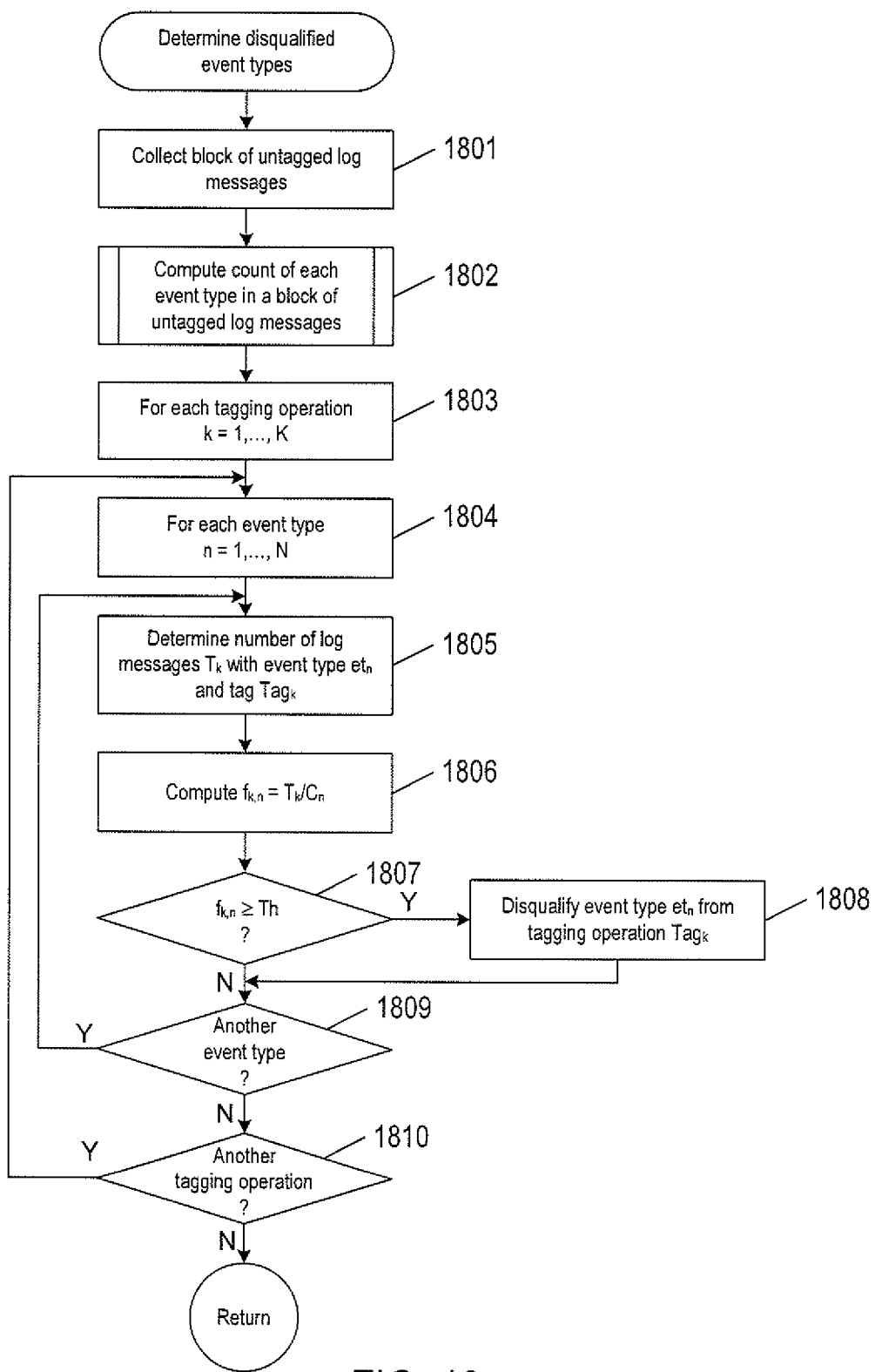
FIG. 18 shows a control flow diagram of the routine "determine disqualified event types" called in FIG. 17.

FIG. 18 shows a control flow diagram of the routine "determine disqualified event types" called in block 1701 of FIG. 17. In block 1801, a block of untagged log messages is collected by copying untagged log messages as described above with reference to FIG. 10. In block 1802, a routine "compute count of each event type in block of untagged log messages" is called. A loop beginning with block 1803, executes the operations represented by blocks 1804-1807 for each tagging operation. A loop beginning with block 1804, executes the operations represented by blocks 1805 and 1806 for each event type. In block 1805, the number of log messages $T_k$ of event type $et_n$ are determined as described above with reference to FIG. 13. In block 1806, the fraction of tagged log messages $f_{k,n}$ is computed as described above with reference to Equation (1). In decision block 1807, when the fraction of tagged log messages $f_{k,n}$ satisfies the condition given by Equation (3), control to decision block 1809. Otherwise, control flows to block 1808. In decision block 1808, the event type $et_n$ is disqualified from receiving tags $Tag_k$ as described above with reference to FIGS. 13 and 14. In decision block 1809, blocks 1805-1808 are repeated for another even type. In decision block 1810, blocks 1804-1809 are repeated for another tagging operation.

Figure 19:
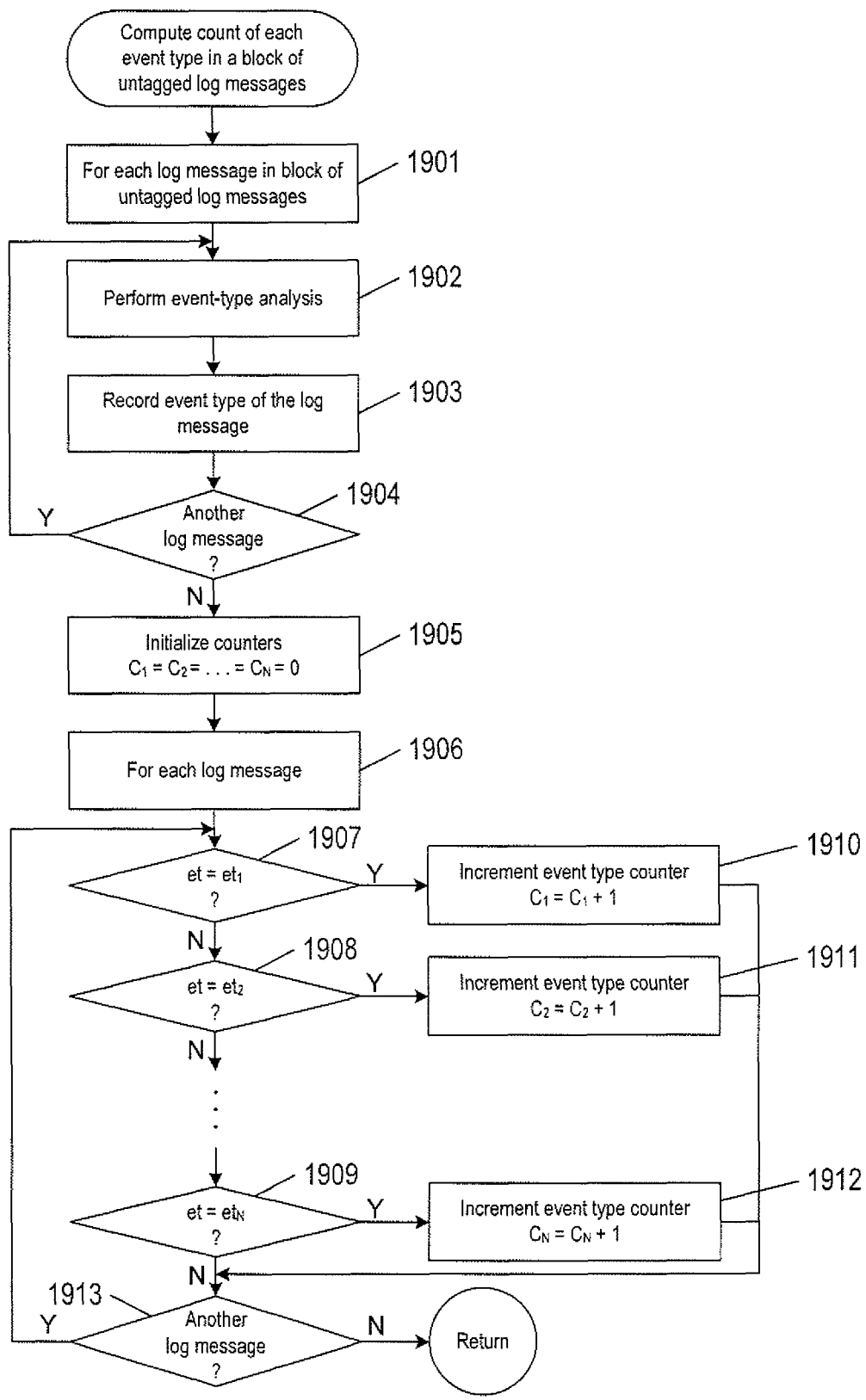
FIG. 19 shows a control flow diagram of the routine "compute count of each event type in a block of untagged log messages" called in FIG. 18.

FIG. 19 shows a control flow diagram of the routine "compute count of each event type in a block of untagged log messages" called in block 1802 of FIG. 18. A loop beginning with block 1901 repeats the computational operations of blocks 1902 and 1903 for each log message in the block of untagged log messages. In block 1902, event-type analysis is performed on each log message as described above with reference to FIG. 9. In block 1903, the event type is recorded with the even message. In decision block 1904, blocks are repeated for another log messages. Otherwise, control flows to block 1905. In block 1905, counters $C_n$ associated each of the event types are initialized to zero. A loop beginning with block 1906, repeats the computational operations of blocks 1906-1911 for even message in the block of untagged log messages. In decision blocks 1907-1909, when the event type of a log message matches of event types determined and recorded in blocks 1902 and 1903, control flows to one corresponding blocks 1910-1912, which increment counters associated with each of the event types. In decision block 1913, blocks 1907-1912 are repeated for another log messages in the block of untagged log messages.

Figure 20:
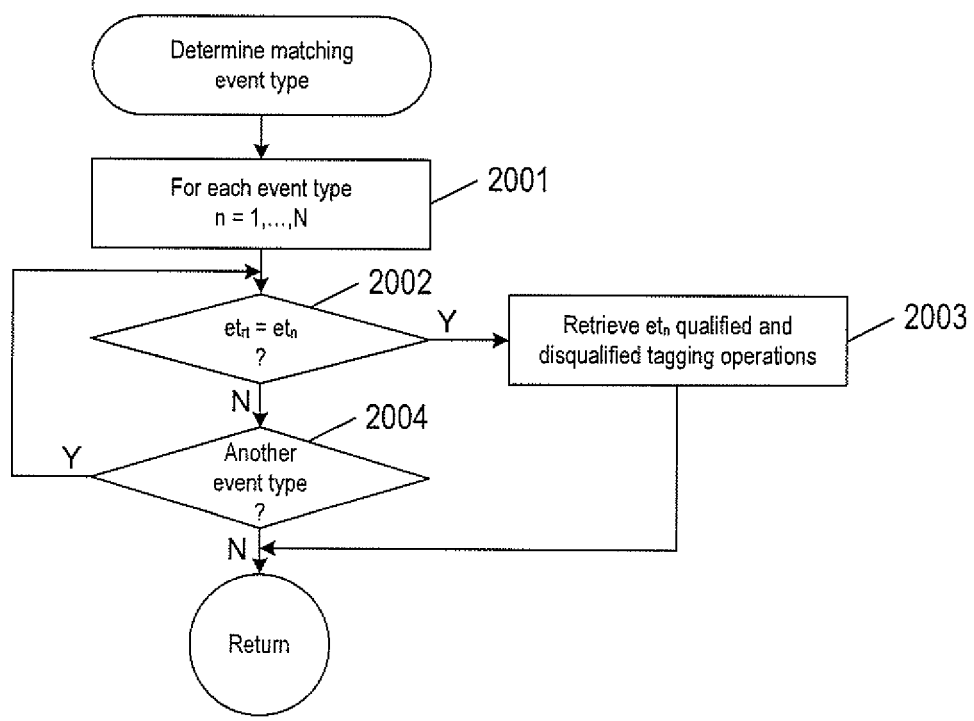
FIG. 20 shows a control flow diagram of a method to "determine corresponding disqualified event types" called in FIG. 17.

FIG. 20 shows a control flow diagram of a method to "determine matching event type" called in block 1704 of FIG. 17. A loop beginning with block 2001 repeats decision block 2003 for each event type of the log messages in the block of untagged log messages. In decision block 2002, when the event type $et_{rt}$ determined in block 1703 matches token for token an event type $et_n$ of the block of untagged log messages, control flows to block 2003. Otherwise, flows to decision block 2004. In block 2003, the qualified and disqualified tags associate with the event type $et_n$ are retrieved. In decision block 2004, decision block 2002 is repeated for another event type $et_n$.

Figure 21:
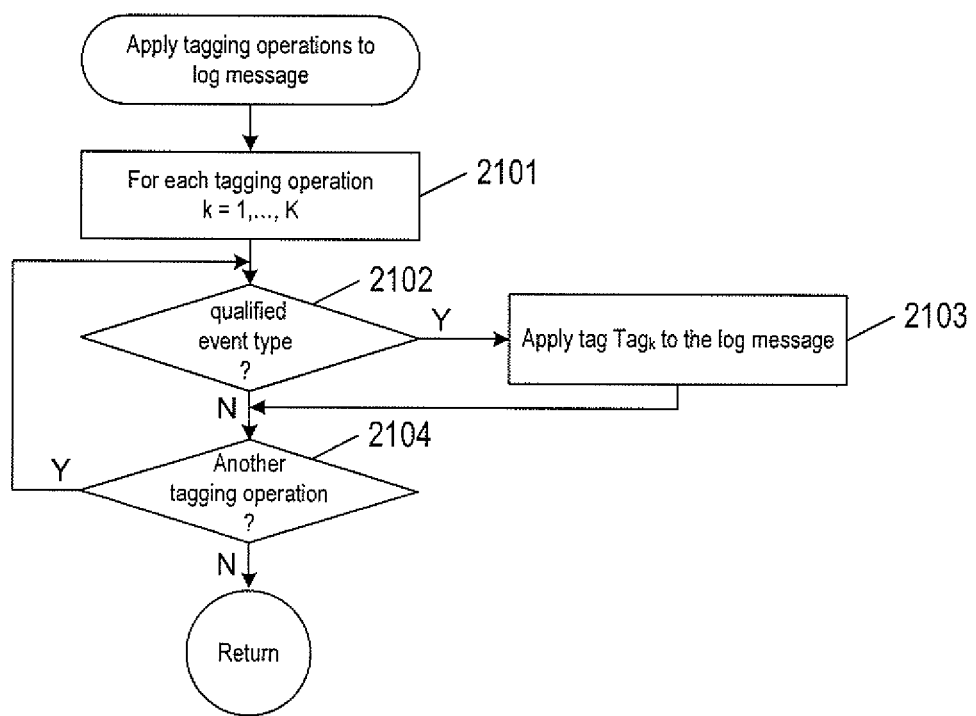
FIG. 21 shows a control flow diagram of a method to "apply tagging operations to log message" called in FIG. 17.

FIG. 21 shows a control flow diagram of a method to "apply tagging operations to log message" called in block 1705 of FIG. 17. A loop beginning with block 2101, repeats the operation of decision block 2102 for each tagging operation. In decision block 2102, when the event type is qualified to receive a tag based on the qualified and disqualified tagging operations associated with the event type determined in block 2003, as described above with reference to FIG. 16B, control flows to block 2103. In block 2103, the tag $Tag_k$ is applied to the log message, as described above with reference to FIG. 16B. In decision block 2104, blocks 2102 and 2103 are repeated for another tagging operation.

It is appreciated that the previous description of the disclosed embodiments is provided to enable any person skilled in the art to make or use the present disclosure. Various modifications to these embodiments will be apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An automated method stored in one or more data-storage devices and executed using one or more processors of a computer system for tagging tokens and sequences of tokens in log messages generated by an event source, the method comprising:
   determining tags each event type of a block of untagged log messages is qualified to receive, the block of untagged log messages generated by the event source;
   performing event-type analysis on a log message generated by the event source to identify an event type of the log message;
   determining an event type of the block of untagged log messages that matches the event type of the log message;
   applying a series of tagging operations to tokens or sequences of tokens of the log message to generate a tagged log message, each tagging operation applying a tag to a token or a sequence of tokens of the log message when the event type of the log message matches an event type of the block of untagged log messages that is qualified to receive the tag; and
   storing the tagged log message in a data-storage device.

2. The method of claim 1 wherein determining the tags each event type of untagged log messages in the block of log messages are qualified to receive comprises:
   applying event-type analysis to each log message of the block of untagged log messages;
   for each event type, determine log messages with the same event type in the block of untagged log messages;
   applying the series of tagging operations to each log message in the block of untagged log messages; and
   for each tag and for each event type,
      determining a count of the log messages with the same event type and with tokens or sequences of tokens that received the same tag;
      computing a fraction of log messages with the same event type and the same tag as a ratio of the count of log messages with the same event type that received the tag to the number of log messages with the same event type, and
      identifying the event type as qualified to receive the tag when the fraction of log messages with the tag is greater than a tagging threshold.

3. The method of claim 1 wherein determining an event type of the block of untagged log messages that matches the event type of the log message comprises:
   comparing the event type of the log message to each of the event types of the block of untagged log message; and
   identifying the matching event type of the block of untagged log message as having the same non-parametric tokens as the event type of the log message.

4. The method of claim 1 wherein applying the series of tagging operations to the log message to generate the tagged log message comprises for each tagging operation in the series of tagging operations, applying the tag to tokens or sequences of tokens of the log message, when the event type of the log message matches an event type of the block of untagged log messages that is qualified to receive the tag of the tagging operation.

5. A system for tagging tokens and sequences of tokens in log messages generated by an event source, the system comprising:
   one or more processors;
   one or more data-storage devices; and
   machine-readable instructions stored in the one or more data-storage devices that when executed using the one or more processors controls the system to perform the operations comprising:
      determining tags each event type of a block of untagged log messages is qualified to receive, the block of untagged log messages generated by the event source;
      performing event-type analysis on a log message generated by the event source to identify an event type of the log message;
      determining an event type of the untagged block of log messages that matches the event type of the log message;
      applying a series of tagging operations to tokens or sequences of tokens of the log message to generate a tagged log message, each tagging operation applying a tag to a token or a sequence of tokens of the log message when the event type of the log message matches an event type of the block of untagged log messages that is qualified to receive the tag; and
      storing the tagged log message in a data-storage device.

6. The system of claim 5 wherein determining the tags each event type of untagged log messages in the block of log messages is qualified to receive comprises:
   applying event-type analysis to each log message of the block of untagged log messages;
   for each event type, determine log messages with the same event type in the block of untagged log messages;
   applying the series of tagging operations to each log message in the block of untagged log messages; and
   for each tag and for each event type,
      determining a count of the log messages with the same event type and with tokens or sequences of tokens that received the same tag;
      computing a fraction of log messages with the same event type and the same tag as a ratio of the count of log messages with the same event type that received the tag to the number of log messages with the same event type, and
      identifying the event type as qualified to receive the tag when the fraction of log messages with the tag is greater than a tagging threshold.

7. The system of claim 5 wherein determining an event type of the block of untagged log messages that matches the event type of the log message comprises:
comparing the event type of the log message to each of the event types of the block of untagged log message; and
identifying the matching event type of the block of untagged log message as having the same non-parametric tokens as the event type of the log message.

8. The system of claim 5 wherein applying the series of tagging operations to the log message to generate the tagged log message comprises for each tagging operation in the series of tagging operations, applying the tag to tokens or sequences of tokens of the log message, when the event type of the log message matches an event type of the block of untagged log messages that is qualified to receive the tag of the tagging operation.

9. A non-transitory computer-readable medium encoded with machine-readable instructions that implement a method carried out by one or more processors of a computer system to perform the operations comprising:
determining tags each event type of a block of untagged log messages is qualified to receive, the block of untagged log messages generated by the event source;
performing event-type analysis on a log message generated by the event source to identify an event type of the log message;
determining an event type of the block of untagged log messages that matches the event type of the log message;
applying a series of tagging operations to tokens or sequences of tokens of the log message to generate a tagged log message, each tagging operation applying a tag to a token or a sequence of tokens of the log message when the event type of the log message matches an event type of the block of untagged log messages that is qualified to receive the tag; and
storing the tagged log message in a data-storage device.

10. The medium of claim 9 wherein determining the tags each event type of log messages in the block of log messages are qualified to receive comprises:
applying event-type analysis to each log message of the block of untagged log messages;
for each event type, determine log messages with the same event type in the block of untagged log messages;
applying the series of tagging operations to each log message in the block of untagged log messages; and
for each tag and for each event type,
determining a count of the log messages with the same event type and with tokens or sequences of tokens that received the same tag;
computing a fraction of log messages with the same event type and the same tag as a ratio of the count of log messages with the same event type that received the tag to the number of log messages with the same event type, and
identifying the event type as qualified to receive the tag when the fraction of log messages with the tag is greater than a tagging threshold.

11. The medium of claim 9 wherein determining an event type of the block of untagged log messages that matches the event type of the log message comprises:
comparing the event type of the log message to each of the event types of the block of untagged log message; and
identifying the matching event type of the block of untagged log message as having the same non-parametric tokens as the event type of the log message.

12. The medium of claim 9 wherein applying the series of tagging operations to the log message to generate the tagged log message comprises for each tagging operation in the series of tagging operations, applying the tag to tokens or sequences of tokens of the log message, when the event type of the log message matches an event type of the block of untagged log messages that is qualified to receive the tag of the tagging operation.

\* \* \* \* \*